L. E. HEALY.
TOP DRESSER FOR SPREADERS.
APPLICATION FILED SEPT. 24, 1917.
1,267,660.
Patented May 28, 1918.
3 SHEETS—SHEET 2.
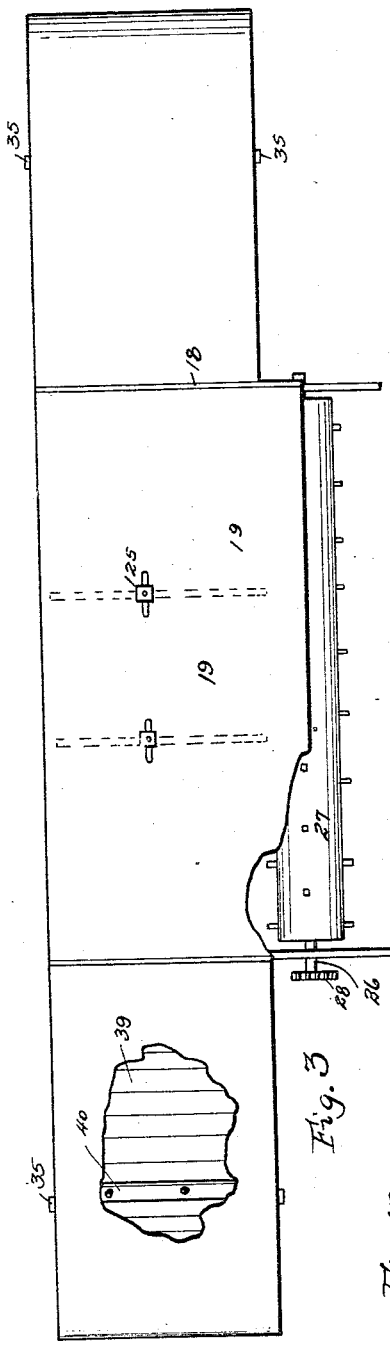
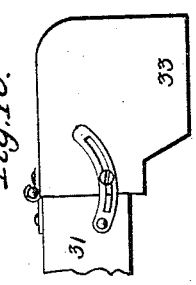
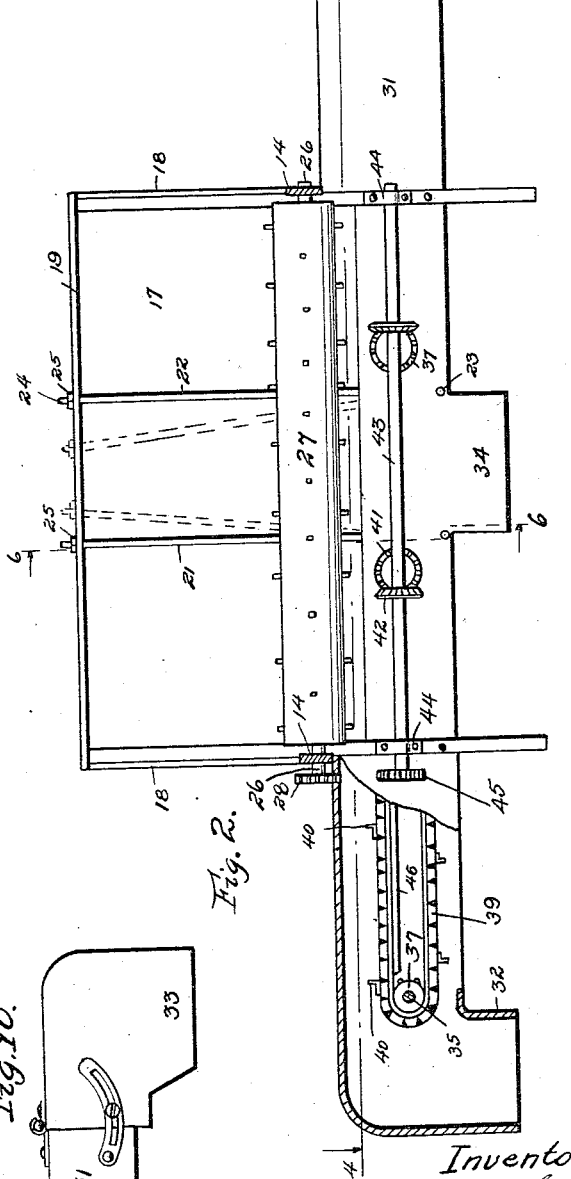

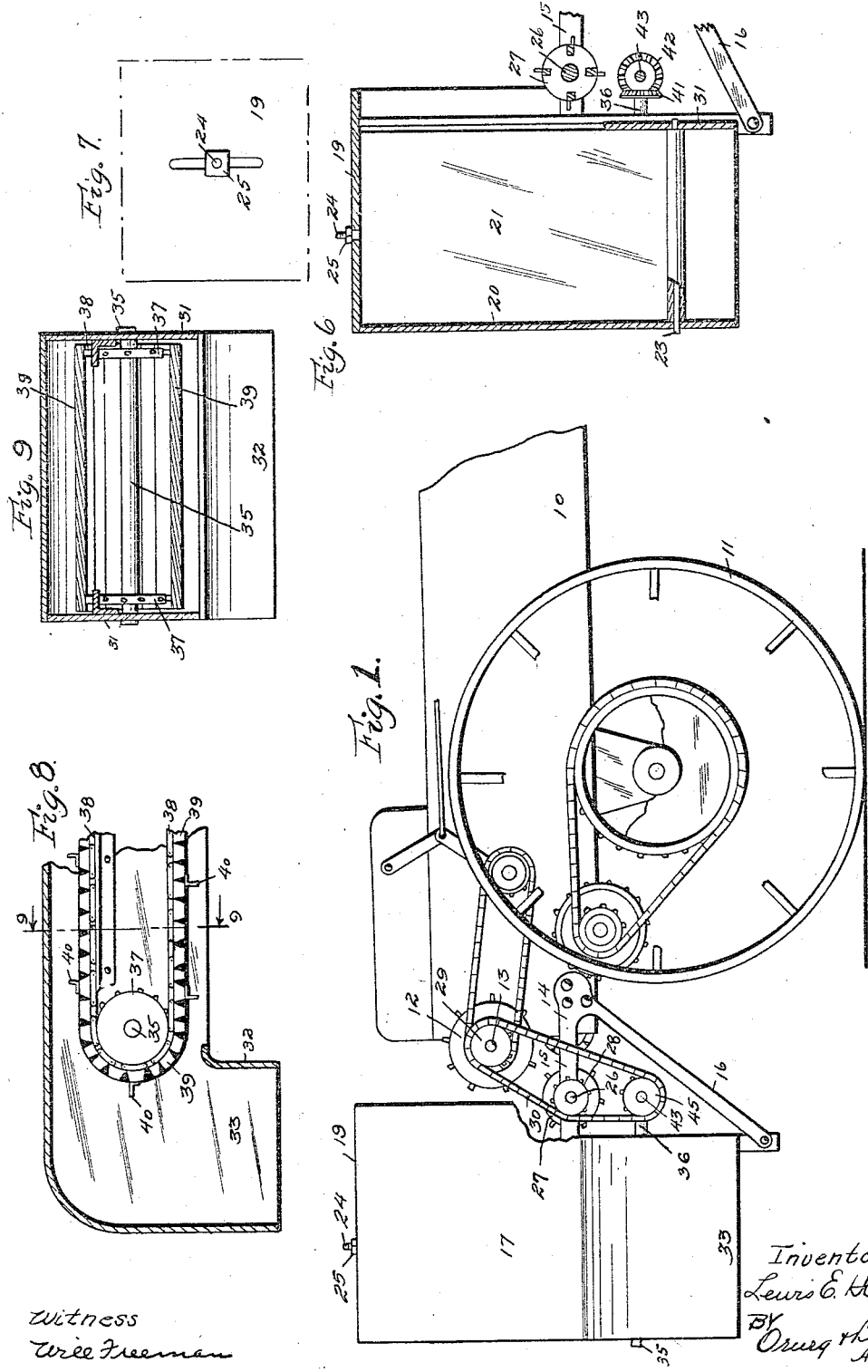

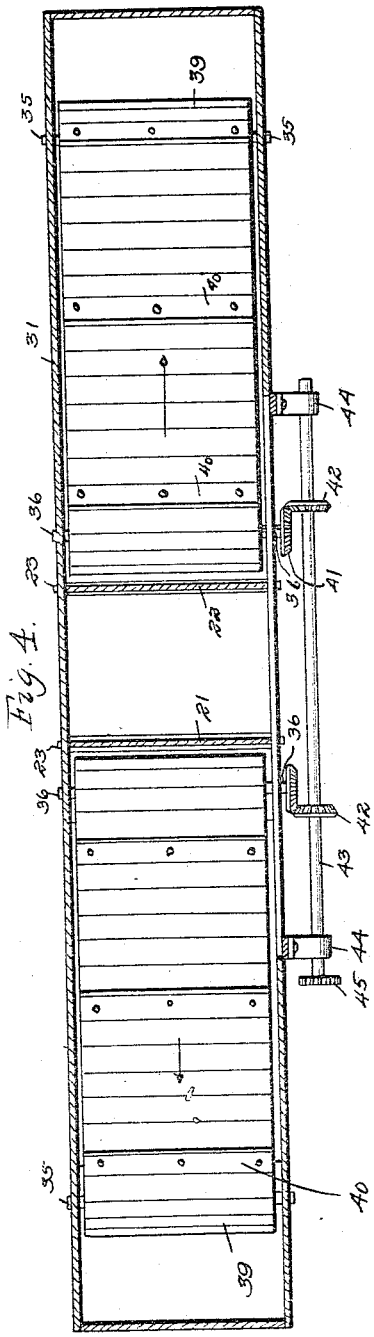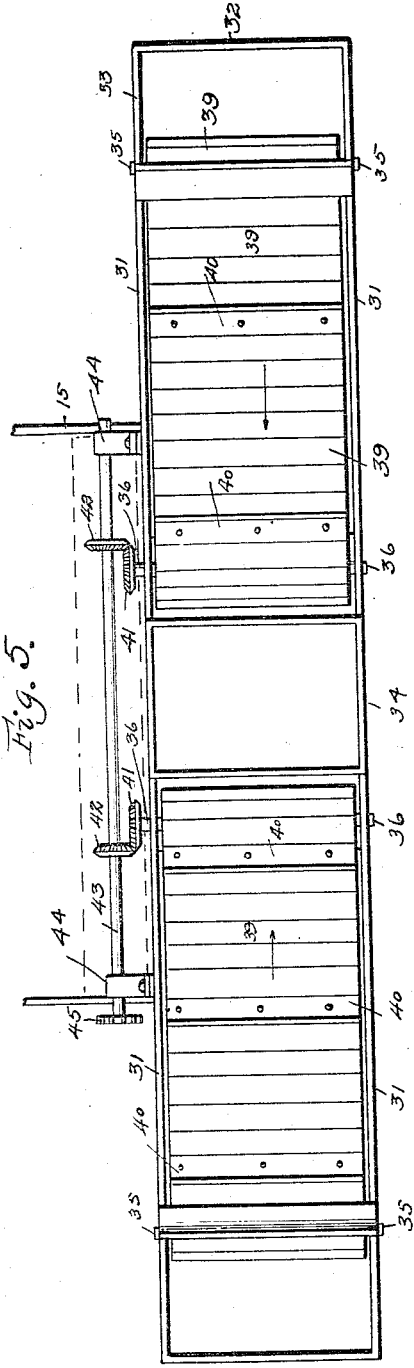

UNITED STATES PATENT OFFICE.

LEWIS E. HEALY, OF KEYSTONE, IOWA.

TOP-DRESSER FOR SPREADERS.

1,267,660.     Specification of Letters Patent.     Patented May 28, 1918.

Application filed September 24, 1917. Serial No. 193,018.

*To all whom it may concern:*

Be it known that I, LEWIS E. HEALY, a citizen of the United States, and resident of Keystone, in the county of Benton and State of Iowa, have invented a certain new and useful Top-Dresser for Spreaders, of which the following is a specification.

The object of my invention is to provide a top dresser for spreaders of simple, durable and inexpensive construction.

It may be mentioned that it has been the custom for a long time to use spreaders to distribute fertilizers broadcast over plowed or harrowed ground, which has not yet been planted and to then cultivate or reharrow the ground whereby the fertilizer is thoroughly mixed with the soil and in some cases the ground is then allowed to lay fallow for sometime in order that it may ripen. This system is subject to the disadvantage that the fertilizer is distributed over the entire surface of a given field whereas the rows of corn or other plants are only planted in a very small proportion of the entire field, so that it may be said that a considerable portion of the fertilizer is wasted by being used to enrich ground, which is not immediately used to support plant life. A further disadvantage arises from the broadcast method of distributing the fertilizer heretofore used in that it is not particularly adapted to be used where a field has been planted and the grain has attained some growth.

A further object of my invention is to provide an attachment adapted to be secured to the spreaders now in general use whereby the fertilizer from the spreader may be distributed in rows of slightly greater width than are the rows of plants in the field whereby the soil directly adjacent to the plants may be enriched. This object is accomplished by providing means for dropping the fertilizer directly onto the rows of plants in a strip perhaps ten or twelve inches wide and then cultivating the field whereby the fertilizer will be thoroughly mixed with the soil adjacent to the roots of the plants and the greatest possible benefit secured therefrom.

A further object is to provide an attachment of this class, which may be secured to an ordinary spreader and which is capable of carrying the fertilizer received from the beater cylinder to a chute or spout above the rows of plants whereby it is dropped onto the plants in such a way that the plants are not injured.

With these and other objects in view, my invention consists in the construction, arrangement and combination of the various parts of the device whereby the objects contemplated are attained, as hereinafter more fully set forth, pointed out in my claims, and illustrated in the accompanying drawings, in which:

Figure 1 shows a side elevation of the rear end of a spreader having my improved top dresser attachment secured thereto.

Fig. 2 shows an elevation of the top dresser removed from the spreader and taken from the side at which it is attached to the spreader.

Fig. 3 shows a top or plan view of the top dresser, parts being broken away to better illustrate the construction.

Fig. 4 shows a horizontal, sectional view taken on the line 4—4 of Fig. 2.

Fig. 5 shows a bottom view of the top dresser.

Fig. 6 shows a vertical, sectional view taken on the line 6—6 of Fig. 2.

Fig. 7 shows an enlarged detail of the means for controlling the direction and amount of movement of the fertilizer.

Fig. 8 shows a vertical, central, transverse, enlarged sectional view of one of the distributing hoods and the parts adjacent thereto.

Fig. 9 shows a sectional view taken on the line 9—9 of Fig. 8; and

Fig. 10 shows a side elevation of an adjustable distributing chute, which may be used with my device.

Referring to the accompanying drawings, I have used the reference numeral 10 to indicate generally the body of a spreader, which is mounted on wheels 11 and is provided with a beater 12, which is mounted upon and driven by beater shaft 13. The beater shaft is operatively connected with the wheels 11 or any suitable motive force whereby it may be rotated when desired. Secured to the body 10 at the rear of each side are a pair of rearwardly extending brackets 14, which in this form of device are each provided with a horizontal extension 15 and an outwardly and rearwardly inclined extension 16 whereby the casing 17 of my top dresser attachment is supported.

The casing 17 of the top dresser attachment consists of a pair of end walls 18, a top 19, and a rear wall 20 whereby a hood is formed, which may be fitted over the ends of the beater and receive from the beater the fertilizer, which would normally be thrown therefrom to the ground. The casing 17 is provided with two spaced partitions, which extend from its top downwardly to a position below the beater cylinder where the lower ends of these partitions 21 and 22 respectively are hinged by a pintle 23 to the casing 17, the pintles 23 being equally distant from each other and from the adjacent end walls 18. The upper ends of the partitions 21 and 22 are provided with upwardly extending screw threaded pins 24, which extend through the top 19 and coact with nuts 25, so that they may be moved transversely of the casing 17 and locked in position as is suggested by the dotted lines in Fig. 2.

A transverse shaft 26 is rotatably mounted in the brace members 15 and carries a supplementary beater cylinder 27, which is disposed substantially under the rear edge of the beater cylinder 12, so that the fertilizer which is thrown downwardly from the beater cylinder 12 will fall upon the cylinder 26 and be thrown therefrom into the casing 17. The cylinder 26 is driven by means of a sprocket 28, screw threaded to the shaft 26 in line with the sprocket 29, which is secured to the end of the beater shaft 13 by a chain 30, which is passed over these two sprockets. By this driving mechanism it will be seen that the cylinder 27 rotates in the same direction as does the beater cylinder whereby its upper surface will tend to throw any fertilizer, which falls upon it into the casing 17.

A second transverse casing 31 is secured to the bottom of the casing 17 and extends laterally therefrom in either direction. Secured to or formed integral with the casing 31 are three chutes or distributing heads 32, 33, and 34. The first two are at the outer ends of the casing 31 and the latter is at the center thereof. The distributing chute 34 is directly below the partitions 21 and 22 so that the fertilizer, which is thrown from the beater cylinder between the partitions 21 and 22 will fall through the chute 34 onto the ground or plants beneath it. The casing 31 and the distributing chutes 32 and 33 are so proportioned and arranged that these chutes will drop the fertilizer received therein onto the rows of plants at either side of the row above which the chute 34 may be disposed. It will thus be seen that means are provided for dropping the fertilizer from the beater cylinder in three parallel narrow strips, which are spaced apart the proper distance, so that these narrow strips of fertilizer will fall directly upon three rows of growing plants. Each end of the casing 31 is provided with a conveyer, which extends from the respective partitions 21 and 22 to points near adjacent outer ends of the casing 31, so that the fertilizer dropped from the spreader onto these conveyers will be carried therefrom outwardly to the chutes 32 and 33 where it will be dropped onto the rows of plants.

Each conveyer consists of a beater shaft 35 and an inner shaft 36 upon which are mounted sprockets 37, which carry chains 38. Upon the chains 38 are mounted cross slats 39, which form a conveyer or carrier for the fertilizer. Regularly reoccurring pushers or followers 40 are mounted on the cross slots 39, so that the fertilizer will be more regularly carried from the casing 17 to the chutes 32 and 33. Each of the shafts 36 is provided with a beveled gear 41, which meshes with a second beveled gear 42, which is secured to a shaft 43, which is in turn journaled in bearings 44, which are secured to the framework of the casing 17. One end of the shaft 43 projects beyond the bearings 44 and is provided with a sprocket 45, which is alined with the sprockets 28 and 29 and also has the chain 30 passing over it whereby the shaft 43 is revolved whenever the beater shaft 13 is revolved. The chains 39 move over guides or angle irons 46 so that they will not sag under the weight of the fertilizer, which is being moved from the casing 17 to the chutes 32 and 33.

The form of distributer chute shown in Fig. 10 may be used in place of the chutes 32 and 33 so that my machine may be used to distribute the fertilizer directly upon the rows of growing grain even though the rows in various fields may be spaced different distances apart.

In the practical operation of my device the top dresser is assembled to present the appearance shown in Fig. 2 and the brackets 14 are then secured to the box of the spreader and the chain 30 operatively connected with the sprockets 28, 29 and 45. The machine is then ready for operation.

The fertilizer from the beater is thrown into the casing 17 and will, of course, fall into the three compartments formed by the partitions 21 and 22. The amount which falls into the respective compartments may be very accurately gauged or equalized by moving the upper end of the partitions 21 and 22 laterally, then locking them by means of nuts 25. It will be seen that some of the fertilizer from the beater cylinder 12 would have a tendency to be carried around to the lower part of the cylinder by its rotation and there wedged against the frame of the casing 17, so that I have provided the supplementary cylinder 27, which receives the fertilizer which drops straight down from the beater cylinder 12 and throws it into the casing 17. This cylinder 27 prevents the fertilizer from becoming clogged in the framework and casing 17 adjacent to the beater and also insures that a large part of the fertilizer will fall upon the conveyers near their longitudinal, central lines, so that the greatest efficiency of the conveyer is utilized to carry the fertilizer to the chutes 32 and 33. If the machine be loaded and drawn over the ground with the traction wheels straddling the rows of corn, it will be seen that there would be a narrow strip of fertilizer thrown upon the plants in the row, which the traction wheels straddled in the two adjacent rows. It has been found by experiments that when this eight to twelve inch strip of fertilizer is dropped onto the ground adjacent to the rows of corn, it is then possible to drive a cultivator between the rows, which results in thoroughly mixing the fertilizer with the soil adjacent to the roots of the plants whereby the greatest benefit from the fertilizer is secured. Actual experiments have demonstrated that after the cultivator passes over these fields, which have been treated with my top dresser, very few particles of the fertilizer appear above the ground adjacent to the plants and that the fertilizer is thoroughly mixed with the soil adjacent to the roots of the plants.

I claim as my invention:

1. In a device of the class described, a casing adapted to receive the fertilizer from the beater cylinder of a spreader, a plurality of partitions disposed within said casing whereby it is divided into compartments, lateral extensions projecting from either end of the casing, a conveyer mounted on each of said extensions and extended into one of the compartments in the casing whereby the fertilizer received in said compartments may be carried therefrom by said conveyer, a chute formed at the outer end of each of said supports adapted to receive the fertilizer from said conveyers and to drop same upon the ground in narrow strips, a central chute formed below the central compartment of the casing, and means for operatively connecting said conveyers with the operating mechanism of the spreader whereby the fertilizer delivered by the spreader to said casing may be delivered to said chutes.

2. In a device of the class described, a casing adapted to receive the fertilizer from the beater cylinder of a spreader, a plurality of partitions disposed within said casing whereby it is divided into compartments, means for varying the position of said partitions whereby the relative sizes of said compartments may be varied, lateral extensions projecting from either end of the casing, a conveyer mounted on each of said extensions and extended into one of the compartments in the casing whereby the fertilizer received in said compartment may be carried therefrom by said conveyer, and means for operatively connecting said conveyers with the operating mechanism of the spreader whereby the fertilizer delivered by the spreader to said casing may be delivered to the outer ends of said extensions.

3. In a device of the class described, a central casing adapted to be secured to a spreader and to receive the fertilizer therefrom, an extension formed at either side of said casing, chutes formed at the outer ends of both of said extensions and centrally of the casing whereby the fertilizer delivered to said chutes may be dropped in narrow strips on three adjacent rows of growing plants, means for conveying the fertilizer received by said casing to said chutes, and means for regulating the proportionate amount of fertilizer received by each of said chutes.

4. In a device of the class described, a casing adapted to be secured to a spreader and to receive fertilizer from the beater cylinder thereof, a plurality of spaced chutes secured to said casing and adapted to deliver fertilizer to rows of growing plants, means for conveying the fertilizer from said casing to said chutes, a toothed cylinder rotatably mounted in said casing in such position that its axis will be parallel to but spaced downwardly and rearwardly from the axis of the beater cylinder of the spreader, and means for revolving said toothed cylinder, whereby the fertilizer is prevented from clogging the casing.

Des Moines, Iowa, September 11, 1917.

LEWIS E. HEALY.

Copies of this patent may be obtained for five cents each, by addressing the "Commissioner of Patents, Washington, D. C."